2 Sheets—Sheet 2.

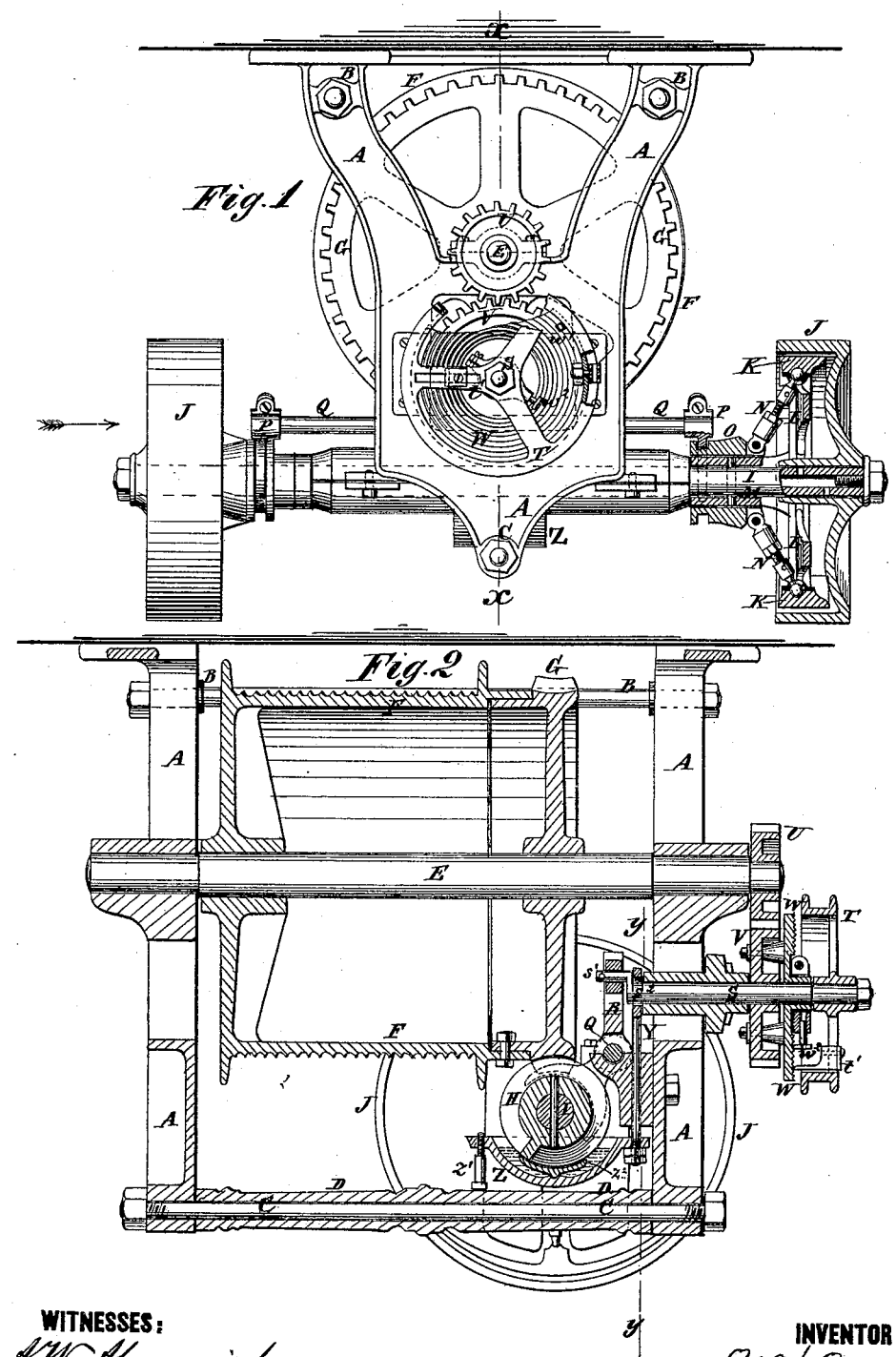

V. W. MASON.
ELEVATOR HOISTING MACHINE.

No. 175,722. Patented April 4, 1876.

WITNESSES:
A. W. Almqvist
J. Goethals

INVENTOR:
V. W. Mason
BY
ATTORNEYS.

N. PETERS, PHOTO-LITHOGRAPHER, WASHINGTON, D. C.

UNITED STATES PATENT OFFICE

VOLNEY W. MASON, OF PROVIDENCE, RHODE ISLAND.

IMPROVEMENT IN ELEVATOR HOISTING-MACHINES.

Specification forming part of Letters Patent No. 175,722, dated April 4, 1876; application filed January 4, 1876.

*To all whom it may concern:*

Figure 3:
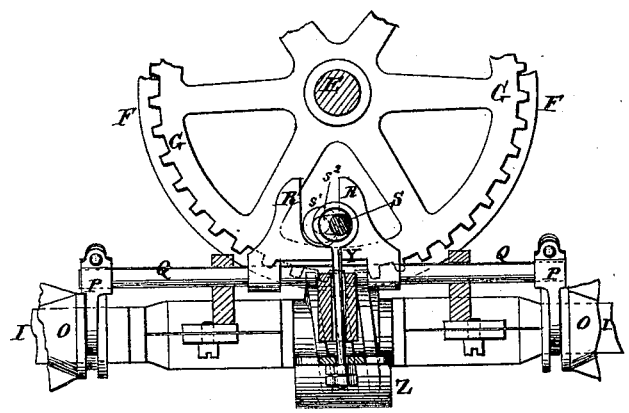
Figure 4:
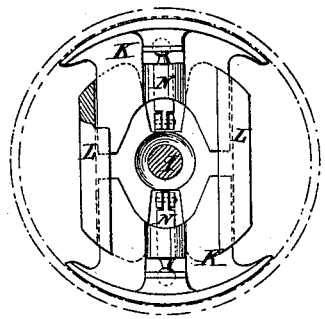

Be it known that I, VOLNEY W. MASON, of Providence, in the county of Providence and State of Rhode Island, have invented a new and useful Improvement in Elevator Hoisting-Machine, of which the following is a specification:

Figure 1, Sheet 1, is a front view of my improved machine, part of the shipper-wheel being broken away and one of the friction-pulleys being shown in section. Fig. 2, Sheet 1, is a vertical longitudinal section of the same, taken through the line $x\,x$, Fig. 1. Fig. 3, Sheet 2, is a detail section taken through the line $y\,y$, Fig. 2. Fig. 4, Sheet 2, is a detail view of one of the friction-clutches.

Similar letters of reference indicate corresponding parts.

The object of this invention is to furnish an improved machine for operating hatchway-elevators and for other similar uses, which shall be simple in construction, safe in use, and readily stopped and reversed.

The invention will first be fully described in connection with the drawing, and then pointed out in the claims.

All the parts of the machine are supported in a frame formed by connecting two hangers by bolts, so that the bearings may be firmly and rigidly supported, and may be less liable to get out of place than when in independent supports.

A are the two hangers, which are bolted at their upper ends to the wood supports. The upper parts of the hangers A are connected by two bolts, B, which have shoulders formed upon them to rest against the inner sides of said hangers when the bolts are screwed up. The lower parts of the hangers A are connected by a bolt, C, which is made without shoulders, and is provided with a sheath, D, against the ends of which the hangers A rest when the nuts upon the ends of the bolt C are screwed up, so that by removing the nut at either end of the bolt C the said bolt can be withdrawn and the sheath D removed to allow any part of the machine to be renewed when required.

E is the shaft of the winding-drum F, the journals of which revolve in bearings in the hangers A. With one end of the drum F is rigidly connected a large worm-wheel, G, which gears with a worm, H, formed upon or attached to a shaft, I, which is placed at right angles with the drum-shaft E, and revolves in bearings attached to the lower part of the inner side of one of the hangers A.

Upon the ends of the shaft I revolve two pulleys, J, to receive the belts for applying power. Either of the pulleys J may be made to carry the shaft I with it in its revolution by a friction-clutch. Any friction-clutch or dog-clutch may be used, but I will describe the one shown in the drawings.

K are two segments, the faces of which correspond with and fit upon the inner surface of the rim of the pulleys J, and their bodies slide radially in guides L, formed upon a sleeve or hub, M, keyed or pinned to the shaft I. To the outer parts of the segments K are connected, by a ball-and-socket joint, the outer ends of the toggles N, the inner ends of which are pivoted to a sleeve, O, that slides upon the sleeve M. Around the inner ends of the two sleeves O are formed grooves, in which ride forks P, attached to the ends of a shipper-bar, Q, which slides in bearings attached to the hanger A or to the bearings of the shaft I, so that by adjusting the said shipper-bar Q either of the pulleys J may be made to drive the machinery, or both may be allowed to run loose, as may be desired. Upon the middle part of the shipper-bar Q is formed, or to it is attached, an upright arm, R, which is slotted vertically to receive the crank $s^1$ formed upon the inner end of the shaft S, which revolves in bearings in the hanger A, and to the outer end of which is rigidly attached to the shipper-wheel T.

The crank $s^1$ is so arranged as to stand vertical when both pulleys J are running loose, and is made of such a length that turning it into a horizontal position will cause the clutch to grasp the pulley toward which the crank is turned, the said crank thus locking the said clutch in place.

The oscillating motion and relative position of crank to sliding thimble is such as to apply the greatest power of the crank at the point of greatest resistance—that is to say, when shipping the clutch to drive. I thus equalize the strain on the shipper-rope.

The shipping-wheel T is turned to stop or reverse the motion by a wire rope or cord passing around and attached to it. To the end of the drum-shaft E, upon the outer side of the hanger A, is attached a small gear-wheel, U, the teeth of which mesh into the teeth of the larger gear-wheel V, which runs loosely upon the shipper-shaft S, and to which is rigidly attached a wheel or disk, W. Upon the face of the disk W is formed a volute or spiral groove running from a point near its center to its circumference. To the disk W, in the outer part of its groove, is recessed a stop, $w^1$, and to said disk in the inner part of its groove is secured a second stop, $w^2$. One or both the stops $w^1$ $w^2$ should be adjustable, so that the motion may be arrested at any desired point. $b'$ is a block or point which enters the groove of the disk W, and the stem of which enters a radial slot in an arm of the shipper-wheel T, and slides radially out and in in said slot as the disk W is turned in one or the other direction.

With this construction the stops $w^1$ $w^2$ are set at the desired ends of movement, and as either of them strikes against the block $t'$, the shipper-wheel T is moved to stop or arrest the motion of the machine. This device prevents accidents, should the wire rope for shipping or stops on same get disarranged or fail in operating the shipper-wheel T.

Upon the shaft S near the crank $s^1$ is formed a cam, $s^2$, around which passes a strap or ring attached to the upper end of a rod, Y, and which is so arranged as to raise the said rod Y to its highest point when the crank $s^1$ is in a vertical position. The lower end of the rod Y is attached to the rear side of the oil-cup Z, that contains oil for lubricating the worm H, and the forward part of which is supported adjustably by a bolt, $z'$, which rests upon the sleeve D of the bolt $c$. In a seat in the bottom of the oil-cup Z is placed a brake-shoe, $Z^2$, which, as the rear part of the oil-cup Z is raised by the rod Y and cam $s^2$, is pressed against the worm H and stops the shaft I, and prevents it from being carried forward by its momentum when thrown out of gear with either pulley.

By the use of friction-clutches and loose pulleys—one on each side of hanger—on a shaft in cross-bearings, and with the weight equally balanced, the belt-strain is equalized, and the loose pulleys become more easily removable for oiling or otherwise, the latter being as easily detached as a carriage-wheel. The shaft may from wear need turning, or the pulley need bushing. Again, I am enabled to oil through the center of shaft while in motion—something that could not be done if one or both pulleys were inside of bearings—and to allow the shipper-forks to be arranged close to the sliding sleeves that operate the clutches. The whole thus forms a more compact operating device, and one that does not permit any spring of the bar or fork.

What I claim as new is—

1. The combination, with shipper-shaft Q, of the slotted arm or yoke R, the shaft S, having crank $s^1$, and the shipper-wheel T, as shown and described, to counteract centrifugal force and equalize shipping-strain.

2. The combination, with shipper-shaft S, having crank $s^1$ and cam $s^2$ in the same plane, of rod Y, cup Z, and brake-shoe $Z^2$, arranged as shown and described, to enable the brake to be automatically applied whenever the clutches are unshipped.

3. The combination, with hangers A A, of friction-clutches and loose pulleys, arranged upon a shaft having the median bearing and the weight balanced, as shown and described, for the purpose specified.

VOLNEY W. MASON.

Witnesses:
   THOS. CORSCADEN,
   CHARLES SELDEN.